United States Patent
Rana et al.

(10) Patent No.: US 10,868,412 B2
(45) Date of Patent: Dec. 15, 2020

(54) CORD GRIP WITH LIQUID DRAIN

(71) Applicant: Cree, Inc., Durham, NC (US)

(72) Inventors: Ashok K. Rana, Morrisville, NC (US); Gerry Thornton, Morrisville, NC (US); Bradley Thomas, Cary, NC (US); William Couch, Wake Forest, NC (US); Benjamin Beck, Union Grove, WI (US); Scott Fisher, Raleigh, NC (US)

(73) Assignee: Ideal Industries Lighting LLC, Sycamore, IL (US)

( * ) Notice: Subject to any disclaimer, the term of this patent is extended or adjusted under 35 U.S.C. 154(b) by 0 days.

(21) Appl. No.: 16/395,473

(22) Filed: Apr. 26, 2019

(65) Prior Publication Data

US 2019/0326737 A1 Oct. 24, 2019

Related U.S. Application Data

(62) Division of application No. 15/715,707, filed on Sep. 26, 2017, now Pat. No. 10,320,168.

(51) Int. Cl.
*H02G 3/06* (2006.01)
*H02G 3/08* (2006.01)
*H02G 3/20* (2006.01)

(52) U.S. Cl.
CPC .......... *H02G 3/0616* (2013.01); *H02G 3/083* (2013.01); *H02G 3/088* (2013.01); *H02G 3/20* (2013.01)

(58) Field of Classification Search
CPC ...... H02G 3/0616; H02G 3/083; H02G 3/088; H02G 3/20
See application file for complete search history.

(56) References Cited

U.S. PATENT DOCUMENTS

| | | |
|---|---|---|
| 3,993,330 A | 11/1976 | Goransson |
| 7,857,358 B2 | 12/2010 | Rolland et al. |
| 8,807,382 B1 | 8/2014 | Haberbusch et al. |
| 9,786,639 B2 | 10/2017 | Bergmann et al. |
| 2009/0255724 A1 | 10/2009 | Anders et al. |
| 2012/0325548 A1 | 12/2012 | Martinson et al. |
| 2014/0069711 A1 | 3/2014 | Barna |

*Primary Examiner* — Chau N Nguyen
(74) *Attorney, Agent, or Firm* — Myers Bigel, P.A.

(57) ABSTRACT

A cord grip has a conduit hub configured to be connected to an electronics housing. A bore is formed in the conduit hub and has a first end communicating with the electronics housing and a second end configured to be connected to a conduit. A wire seal retains electrical wiring and is located in the hub forming a liquid-tight seal between the first end and the second end. A channel for transporting liquid from the conduit has an inlet communicating with the conduit and an outlet communicating with the exterior of the electronics housing. An overmolded bond may be formed between the wire seal and the electrical wiring.

11 Claims, 12 Drawing Sheets

CORD GRIP WITH LIQUID DRAIN

CROSS-REFERENCE TO RELATED APPLICATION

The present application is a divisional application of U.S. application Ser. No. 15/715,707, filed on Sep. 26, 2017. The disclosure of which is incorporated herein by reference in its entirety.

BACKGROUND OF THE INVENTION

The invention relates to a cord grip for electrical conduit and more particularly to a cord grip suitable for use with electrical components having a housing or electrical box such as lighting fixtures.

Electrical fixtures having electronics housings, such as lighting fixtures, and other electrical boxes, enclosures and housings (hereinafter referred to collectively as an "electronics housing") are ubiquitous in residential, commercial, office and industrial spaces throughout the world. In a typical application electrical wiring is run to the electronics housing inside of a conduit where the conduit may be rigid or flexible and may be made of metal, plastic or other material. Electrical wires that carry electrical current to the electronics housing runs through the conduit. Typically the conduit is secured to the electronics housing and the electrical wires enter the electronics housing through a hole in the electronics housing. A cord grip may be provided to secure the conduit and the wiring to the electronics housing. The cord grip may provide a connection, such as a threaded connection between the conduit and the electronics housing, and may include a rubber grommet that may grip the electrical wiring.

One type of electronics housing may be found in a lighting fixture. More recently, with the advent of efficient solid state lighting sources, these lighting fixtures are often used with LEDs. LEDs are solid state devices that convert electric energy to light and generally comprise one or more active regions of semiconductor material interposed between oppositely doped semiconductor layers. When a bias is applied across the doped layers, holes and electrons are injected into the active region where they recombine to generate light. Light is produced in the active region and emitted from surfaces of the LED. Electronics in such electrical housings are susceptible to damage when exposed to liquids such as water.

SUMMARY OF THE INVENTION

In some embodiments a cord grip comprises a conduit hub configured to be connected to an electronics housing. A bore is formed in the conduit hub and has a first end in communication with the electronics housing and a second end configured to be connected to a conduit. A wire seal retains electrical wiring and is located in the hub forming a liquid-tight seal between the first end and the second end. A channel for transporting liquid from the conduit has an inlet communicating with the conduit and an outlet communicating with the exterior of the electronics housing.

The electrical wiring may extend through the wire seal. An overmolded bond may be formed between the wire seal and the electrical wiring. The electrical wiring may comprise at least one electrical wire or a plurality of electrical wires encased in sheathing. The electronics housing may be part of a lighting fixture. The conduit hub may be mounted to a connector on the electronics housing, the channel being formed at least partially between the conduit hub and the connector. The channel may be formed internally of the conduit hub. The conduit hub may be mounted to a connector on the electronics housing, and the wire seal is received in the connector. The wire seal may be retained in the bore by a lock member. The lock member may be threadably engaged with screwthreads in the bore. The lock member may hold the wire seal against a shoulder formed in the bore. The lock member may be disposed to a first side of the channel inlet and an end of the conduit may be disposed to a second side of the end of the conduit. The wire seal may comprise a plate and the plate is secured to the conduit hub. A shoulder may be formed in the bore that defines a hole and the wire seal may comprise a plate that is secured to the conduit hub and a sealing member that engages the hole. The plate may be overmolded with the sealing member. Electrical wiring may extend through the wire seal where the plate and the electrical wiring are overmolded with the sealing member.

In some embodiments, a cord grip, comprises a conduit hub configured to be connected to an electronics housing. A bore is formed in the conduit hub having a first end communicating with the electronics housing and a second end configured to be connected to a conduit. A wire seal is located in the hub forming a liquid-tight seal with the conduit hub. Electrical wiring is overmolded bonded to the wire seal to create a liquid-tight seal between the electrical wiring and the wire seal. A channel for transporting liquid from the conduit has an inlet communicating with the conduit and an outlet communicating with the exterior of the electronics housing.

The wire seal may comprise a seal member located to one side of the channel. The electronics housing may be part of a lighting fixture.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element, layer or region to another element, layer or region as illustrated in the figures. It will be understood that these terms are intended to encompass different orientations of the device in addition to the orientation depicted in the figures.

Unless otherwise expressly stated, comparative, quantitative terms such as "less" and "greater", are intended to encompass the concept of equality. As an example, "less" can mean not only "less" in the strictest mathematical sense, but also, "less than or equal to."

The cord grip of the invention prevents the entry of water into electronics housings and provides strain relief for the electrical wiring entering the electronics housing. While the cord grip of the invention is shown and described below with respect to an electronics housing used in conjunction with an LED lighting fixture, the cord grip of the invention may be advantageously used with any electronics housing where the presence of water or other liquid may be problematic such as junction boxes, fuse boxes, NEMA enclosures and/or electronics housings used with electrical equipment other than a lighting fixture (hereinafter referred to collectively as an "electronics housing").

Figure 1:
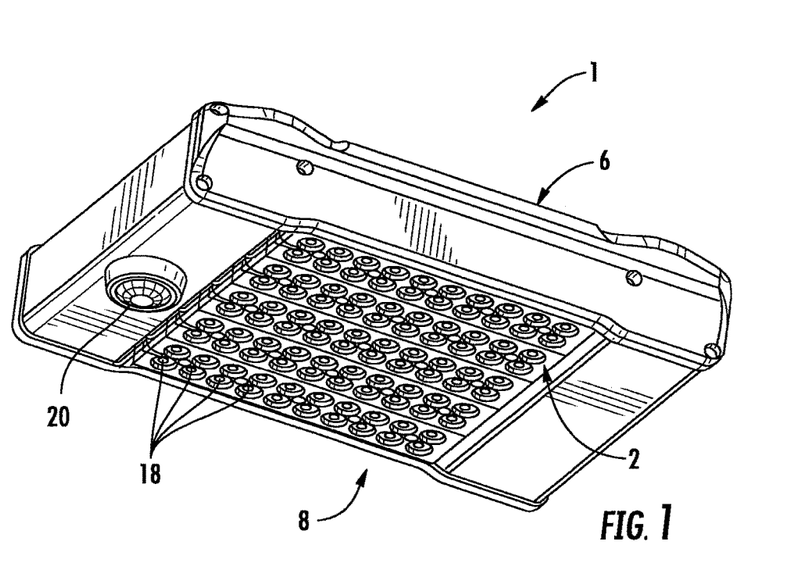
FIG. 1 is a perspective view of an embodiment of a lighting fixture in which the cord grip of the invention may be used.
Figure 2:
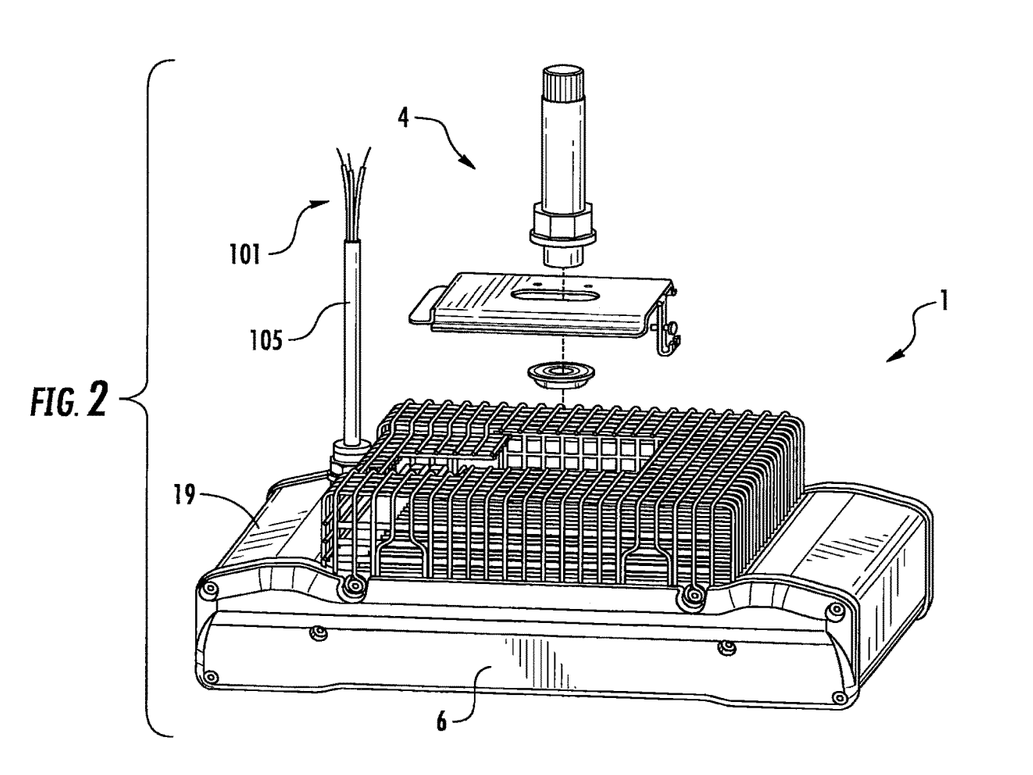
FIG. 2 is an exploded perspective view of the lighting fixture of FIG. 1.

One environment in which the cord grip of the invention may be used will be described with respect to FIGS. 1 and 2. FIGS. 1 and 2 show lighting fixture 1 that uses solid state light sources, such as LEDs 18. The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 2200K to about 6000K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

Referring to FIGS. 1 and 2, a lighting canopy or lighting fixture 1 comprises a fixture housing 6 that may be attached to a ceiling or other suitable support structure. For example the lighting fixture may be suspended from a ceiling by cables, rods, brackets or other supports 4. The lighting fixture 1 is shown in FIG. 1 in a typical orientation where the light is emitted in a generally downward direction; however, in use the lighting fixture may have other orientations. A lens assembly 2, comprising an optically transmissive material, is mounted to the fixture housing 6 creating an interior space defined by the fixture housing 6 and lens assembly 2. The interior space created by the lens assembly 2 and housing 6 contains an LED assembly 8 comprising a plurality of LEDs 18 forming an LED array that emit light when actuated through an electrical path. The lens assembly 2 may be mounted in the troffer housing 6 by any suitable mechanism. The housing 6 and lens assembly 12 may have a wide variety of configurations and the lighting fixture as shown in FIGS. 1 and 2 is only one example of such a lighting fixture.

Lamp electronics may be contained in electronics housing 19. The electronics housing may form part of the fixture housing 6, as shown, or it may be a separate box attached to the lighting fixture or other electronics equipment. Moreover, the electronics housing may be a standalone enclosure such as a junction box. In the embodiment of a lighting fixture the electronics housing 19 may contain electronics such as a driver and power supply for powering the LEDs 18 in LED assembly 8, and control circuitry for SmartCast® technology as provided by Cree, Inc. or the like. For lighting fixtures equipped with SmartCast® technology or other similar controls, sensors 20 for detecting motion, ambient light, wireless signals or other stimulus may be provided. A driver circuit or multiple driver circuits may be housed within electronics housing 19 and may form part of the electrical path to the LEDs for providing current to the LEDs. Electronic components within the compartment 19 may be shielded and isolated. Various driver circuits may be used to power the light sources. Suitable circuits are compact enough to fit within the compartments, while still providing the power delivery and control capabilities necessary to drive high-voltage LEDs, for example. At the most basic level a driver circuit may comprise an AC to DC converter, a DC to DC converter, or both. In one embodiment, the driver circuit comprises an AC to DC converter and a DC to DC converter, both of which are located inside the compartment. In another embodiment, the AC to DC conversion is done remotely (i.e., outside the fixture), and the DC to DC conversion is done at the control circuit inside the compartment. In yet another embodiment, only AC to DC conversion is done at the control circuit within the compartment. Some of the electronic circuitry for powering the LEDs 18 may also be contained as part of the LED assembly 8.

Typically the LED assembly 8 comprises one or more LED boards supporting and electrically coupled to the LEDs 18. The LED board may be any appropriate board, such as a PCB, flexible circuit board or metal core circuit board with the LEDs 18 mounted and interconnected thereon. Details of suitable arrangements of the LEDs and lamp electronics for use in the lighting fixture 1 are disclosed in U.S. patent application Ser. No. 15/226,992, entitled "Solid State Lighting fixtures Suitable for High Temperature Operation Having Separate Blue-Shifted-Yellow/Green and Blue-Shifted-Red Emitters" filed on Aug. 3, 2016 which is incorporated by reference herein in its entirety. In other embodiments, all similarly colored LEDs may be used where for example all warm white LEDs or all warm white LEDs may be used where all of the LEDs emit at a similar color point.

The electrical path to the LEDs may also comprise electrical wiring 100 for providing critical current to the lighting devices such as LEDs 18. The electrical wiring 100 is run to the electronics housing 19 through a conduit 102. The conduit 102 may be a rigid or flexible tube and may be made of metal, plastic or other material. In most applications multiple sections of conduit are connected together to create long runs connecting the electrical wiring 100 from a source of power such as a buildings power grid to the electronic components in electronics housing 19. In most applications the conduit 102 is not sealed such that water may form inside of the conduit. It will be appreciated that water may develop in conduit 102 as a result of condensation inside of the conduit 102 from humidity in the air. Water may also leak into the conduit 102 through gaps in the conduit run. When water, or other liquids, enters into or is formed in the conduit 102 some of the water may drain and collect at the interface between the conduit 102 and the electronics housing 19. Some of the water may leak into the electronics housing 19 and into the lighting fixture where it may accumulate on the electrical components of the fixture causing degradation of the system components. The water may degrade the performance of the components such as the power supply, LEDs, electronics boards and the like. With LED lighting systems of the type described above, the lens assembly 2 is often sealed to the fixture housing 6 such that the internal chamber that contains the LED assembly 8 is a closed space. As the lighting fixture heats and cools during activation and deactivation of the LEDs 18, the air inside of the lighting fixture repetitively warms and cools causing the air in inside the housing to cyclically expand and contract. The expansion and contraction of the air in space 4 can cause water in the conduit 102 to be drawn into the electronics housing 19 exacerbating the issue. Moreover, in some embodiments, the lighting fixture may be used in a refrigerated environment or in a cold outdoor environment where the expansion and contraction of the system due to heating and cooling may be significant.

Figure 3:
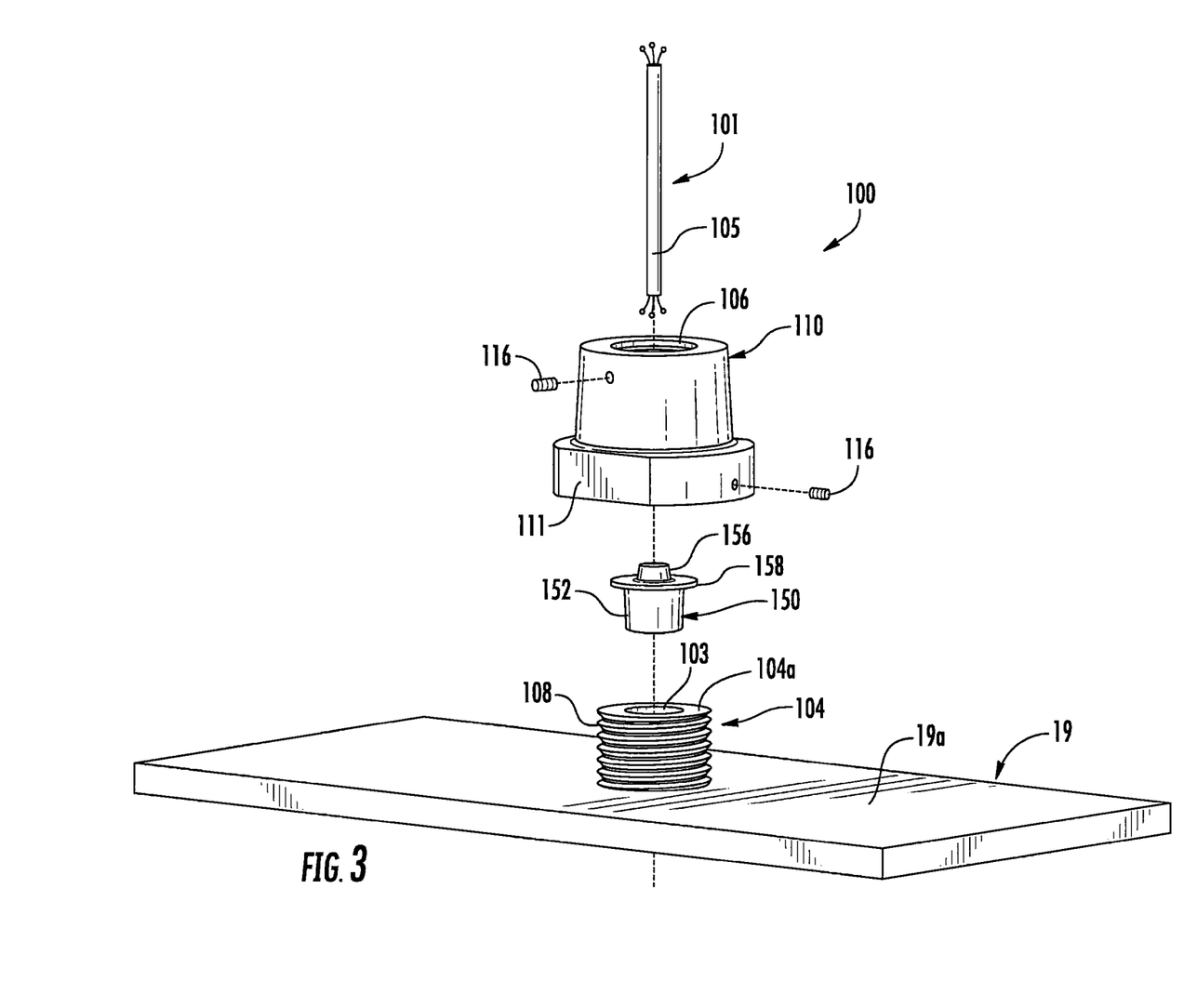
FIG. 3 is an exploded perspective view of the cord grip of the invention.

Referring to FIG. 3, an embodiment of a cord grip 100 is shown comprising a conduit hub 110 that threadably engages a threaded connector 104 on the electronics housing 19, electrical wiring 101 and a wire seal 150. A portion of an electronics housing 19 is shown that, in one embodiment, comprises externally threaded connector 104 that includes an internal bore 103 that functions as a conduit to communicate the interior of the electronics housing 19 with the exterior of the electronics housing. The threaded connector 104 comprises external threads 108 that threadably engage internal threads formed on conduit hub 110. In some embodiments, the threaded connector 104 is formed integrally with a wall 19a of the electronics housing 19. In other embodiments, the threaded connector 104 may be a separate member from the electronics housing 19 and may be, for example, connected to a knockout hole 103 in the wall of the electronics housing by a lock nut or other mechanism. Other mechanisms for providing a threaded connector 104 on the electronics housing 19 may be used.

Referring to FIGS. 5-9, the internal bore 106 of conduit hub 110 comprises a first internally threaded bore 112 that threadably engages screw threads 102a formed on the end of conduit 102. The threads 112a may be NPT threads. While the connection between the conduit 102 and the conduit hub 110 is typically a threaded connection between threads 112a of the conduit hub 110 and the threads 102a on the end of conduit 102, the conduit 102 may be coupled to the conduit hub 110 by welding, brazing, soldering, compression coupling or the like. Moreover, an intermediate coupling may be placed between the conduit 102 and conduit hub 110 that connects these components together. Set screws 116 may be used to lock the conduit 102 to the conduit hub 110 and the conduit hub 110 to the threaded connector 104.

The internal bore 106 of conduit hub 110 comprises a second internally threaded bore 114 comprising screw-threads 144a that threadably engage the external threads 108 of the connector 104. The threads 114a may be standard straight threads. The exterior of conduit hub 110 may be formed with flat surfaces 111 that are configured to be gripped by a tool such as a wench to facilitate the mounting of the conduit hub 110 on the connector 104. In the embodiment of FIG. 3 two flat surfaces 111 are formed that extend only along a partial height of the conduit hub 110 with the remaining height of the conduit hub 110 being cylindrical while in the embodiment of FIG. 10 six flat surfaces 111 are provided that extend for the entire height of the conduit hub 110 to create a hex nut style configuration.

The threaded bores 112, 114 are axially aligned such that bore 106 creates an internal passage through the conduit hub 110. An annular shoulder 118 is formed between the bores 112, 114 that defines a central opening 120. The shoulder 118 provides a stop against which the end of the conduit 102 may abut when the conduit is fully inserted into the first bore 112. The shoulder 118 also provides a portion of the drain channels and seal for the cord grip as will be described. When the conduit hub 110 is mounted on connector 104 the bores 103 and 106 are axially aligned to create a conduit from the exterior of the conduit hub to the interior of the electronics housing 19.

At least one channel 130 is formed in the conduit hub 110 that extends from a channel inlet 132 that is in fluid communication with the bore 106 and conduit 102 to a channel outlet 134 that communicates with and evacuates to the exterior of the conduit hub 110. In the illustrated embodiment four channels 130 are provided that are spaced equally around the conduit hub 110. While four equally spaced channels 130 are shown, a greater or fewer number of channels may be provided and the channels do not have to be equally spaced from one another. Each channel 130 includes a generally radially extending portion 136 that extends from the channel inlet 132. The channel inlet 132 is positioned interior of the conduit 102 when the conduit is connected to the conduit hub 110 such that the inlet 132 is in fluid communication with the interior of the conduit 102. In the illustrated embodiment, the first portion 136 of the channel is formed between the channel wall 122 formed in the conduit hub 110 and the top surface 104a of connector 104 when the conduit hub 110 is secured to the connector 104.

A second portion 138 of the channel 130 extends from the end of the first portion 136 to the bottom of the conduit hub 110 and terminates at outlet 134. The second portion 138 of the channel 130 is formed between the channel wall 140 and the threaded side wall of connector 104 when the conduit hub 110 is secured to the connector 104. While in the illustrated embodiment the channel portions 136, 138 are formed between the conduit hub 110 and the connector 104, the channels 130 may be formed completely internally of the conduit hub 110 between the channel inlet 132 and the channel outlet 134. The channel outlet 134 is positioned outside of connector 104 such that any water discharged from the channel outlet is deposited to the exterior of the electronics housing 19. While the channels 130 are described as having two distinct portions 136, 138 that extend between the inlet 132 and the outlet 134, the channels may have other shapes provided the channels are capable of transporting fluid from the inlet 132 that is interior of the conduit hub and in fluid communication with the conduit 102 and bore 106 to an outlet 134 that is outside of the electronics housing 19. For example, the channels 130 may have a curvilinear or serpentine shape such that no sharp corners are used. The channels may also have a greater or fewer number of portions. The portions may also be provided at other than right angles relative to one another.

A wire seal 150 is positioned in the bore 106 between the connector 104 and the conduit hub 110 that receives the electrical wiring 101 and provides a liquid-tight connection between the conduit hub 110 and the connector 104. The wire seal 150 may made of an elastomeric material such as rubber, thermoplastic elastomers, silicone elastomers or the like. The wire seal 150 is deformable to form a liquid tight seal between the conduit hub 110 and the connector 104 as will be described.

Figure 4:
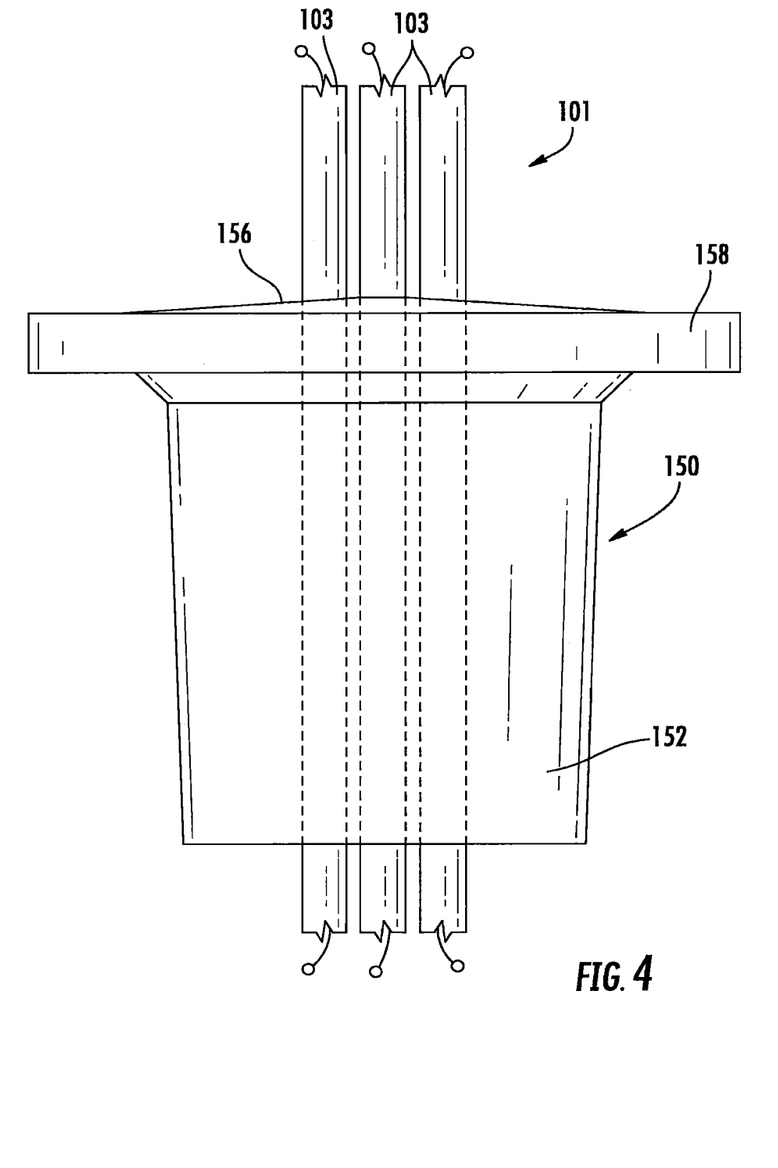
FIG. 4 is a plan view of an embodiment of a wire grip used in the cord grip of the invention.
Figure 9:
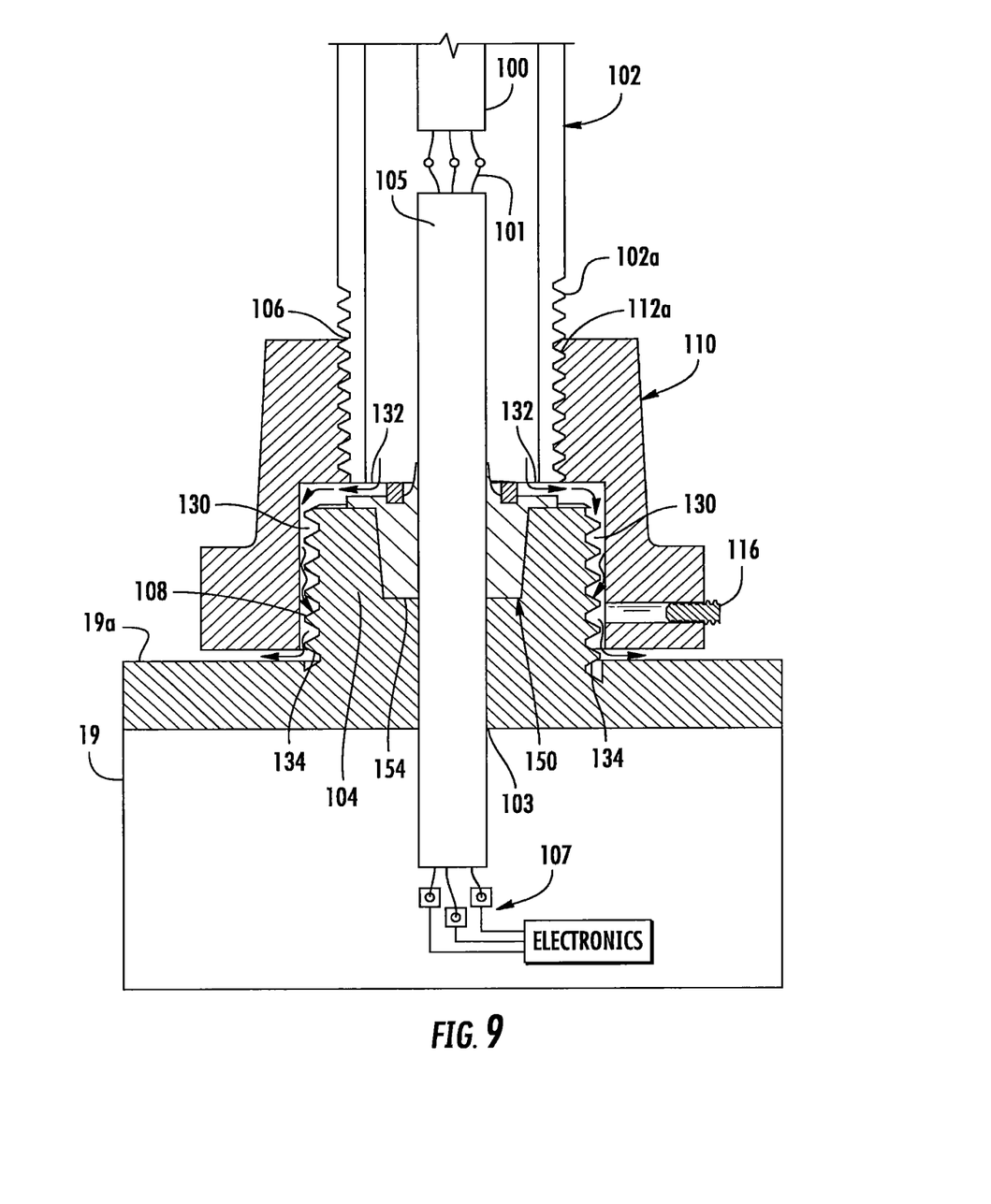
FIG. 9 is a section view showing an electrical conduit attached to the cord grip of FIG. 3.
Figure 10:
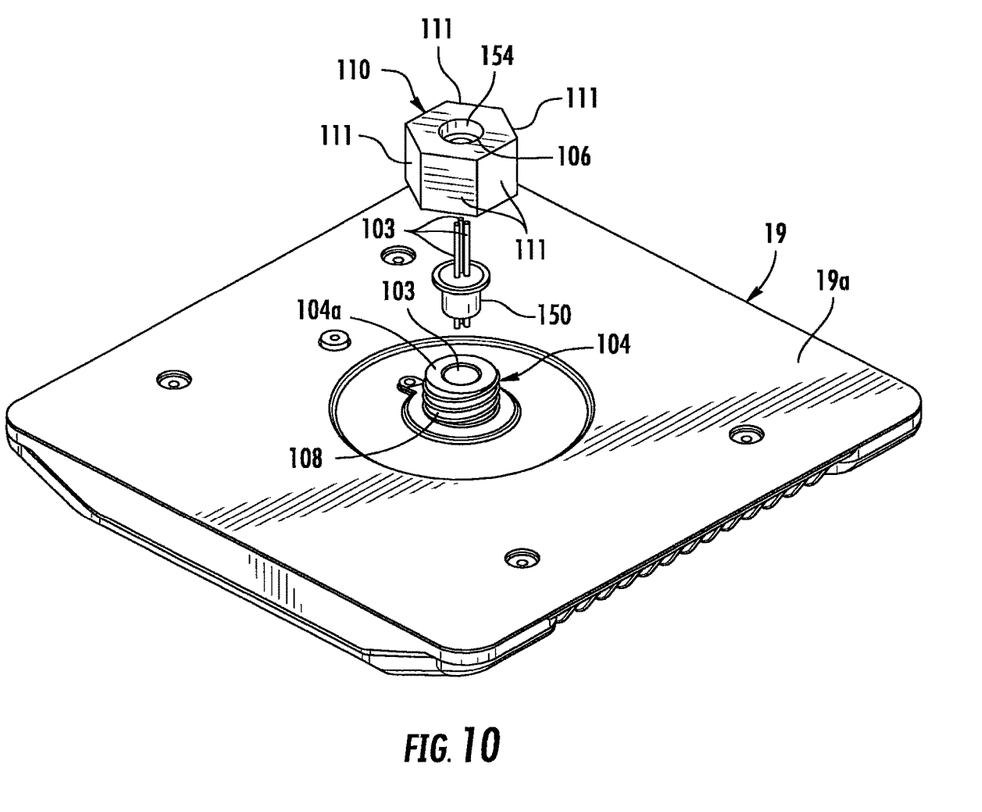
FIG. 10 is a perspective view of an alternate embodiment of the cord grip of FIG. 3.

The wire seal 150 receives electrical wiring 101 such that the electrical wiring 101 extends through the wire seal 150 and between the interior of the electronics housing 19 and the exterior of the conduit hub 110. In one embodiment, the wire seal 150 is overmolded onto the electrical wiring 101 such that the wire seal 150 and the electrical wiring 101 are bonded to one another such that a liquid-tight seal is created between the electrical wiring 101 and the wire seal 150. The electrical wiring 101 may comprise wires 103 that are encased in a common electrically insulating sheathing 105 as shown in FIGS. 3 and 9 such that the wire seal is bonded to the sheathing 105 to create the liquid tight seal. In other embodiments the individual wires 103 of electrical wiring 101 may be individually insert molded in and bonded to the wire seal 150 such that a liquid tight seal is created between the individual wires and the wire seal 150 as shown in FIGS. 4 and 10. Where the electrical wiring is permanently secured in the seal 150, such as by overmolding, the seal 150 and a length of integrated wiring 101 may be provided as a unit where a first connection is made between the integrated electrical wiring 101 and the wiring 100 in the conduit 102 and a second connection is made between the integrated electrical wiring 101 and electrical conductors 107 that are in the electrical path to the lamp electronics in the electronics housing 19 as shown in FIG. 9. The electrical conductors may comprise wires, pads, ribbons or the like that are in the electrical path to the electronics in electronics housing 19. Overmolding the wire seal 150 on electrical wiring 101 provides a permanent liquid-tight seal between the wiring and the wire seal. In an overmolded configuration the electrical wiring 101 is placed inside of a mold cavity and the elastomeric material that forms the wire seal 150 is injected into the cavity such that the elastomeric material is permanently bonded to the electrical wiring during the molding operation. As used herein an overmold bond means the permanent liquid-tight bond formed between the overmolded material, e.g. the elastomeric material, and the part, e.g. the electrical wiring over which the elastomeric material is molded. The overmold bond may result from a mechanical lock between the two components, a melt adhesion and/or a chemical adhesion depending upon the materials used and the structure of the inserted component.

In some embodiments the liquid-tight seal between the wire seal 150 and the electrical wiring 101 may be created by forming through holes in the wire seal into which the wiring 101 is inserted and creating the liquid tight seal by a compression fit, adhesive, ultrasonic welding or the like. In some embodiments the wire seal 150 may be separate from the electrical wiring and the wiring may be inserted through the wire seal during assembly of the system. In such a system the deformable wire seal 150 may be sealed in liquid-tight engagement with the electrical wiring by a compression fit such as when the conduit hub 110 is tightened on the threaded connector 104 or by adhesive, sealant or the like. However, the use of overmolding to create an overmold bond between the wire seal 150 and the electrical wiring 101 provides a cost effective and permanent liquid tight seal.

Figure 5:
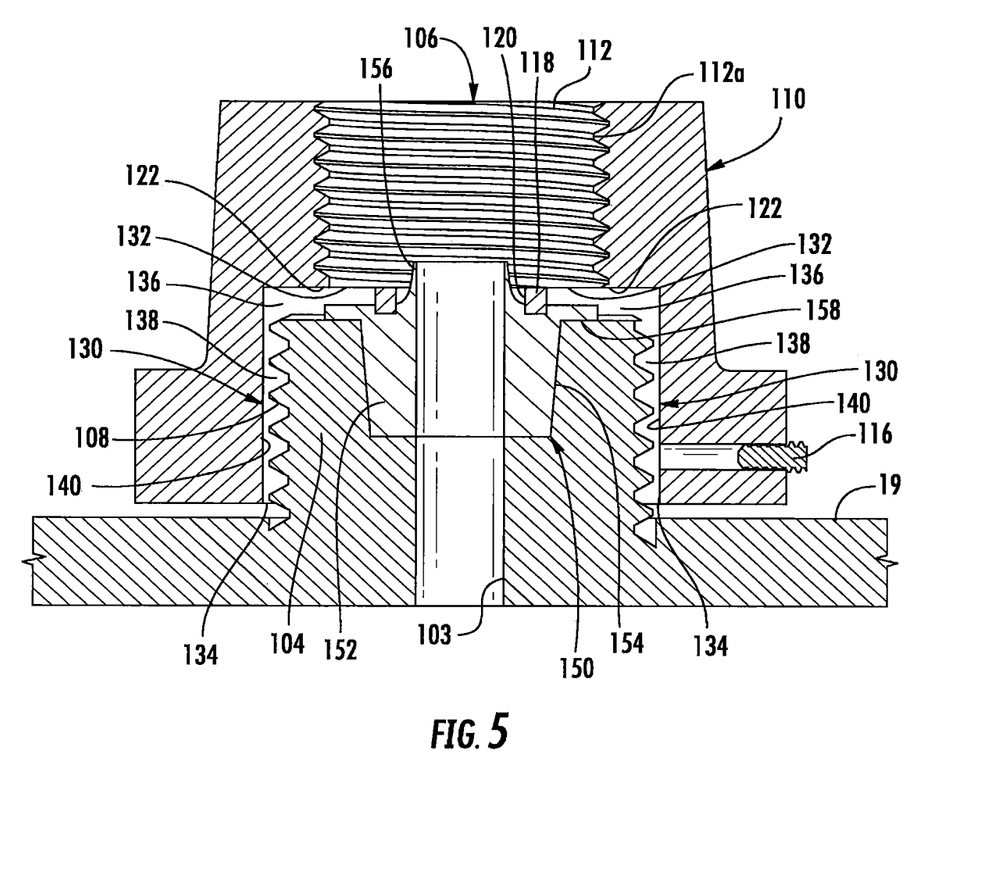
FIG. 5 is a section view of the cord grip of FIG. 3.
Figure 6:
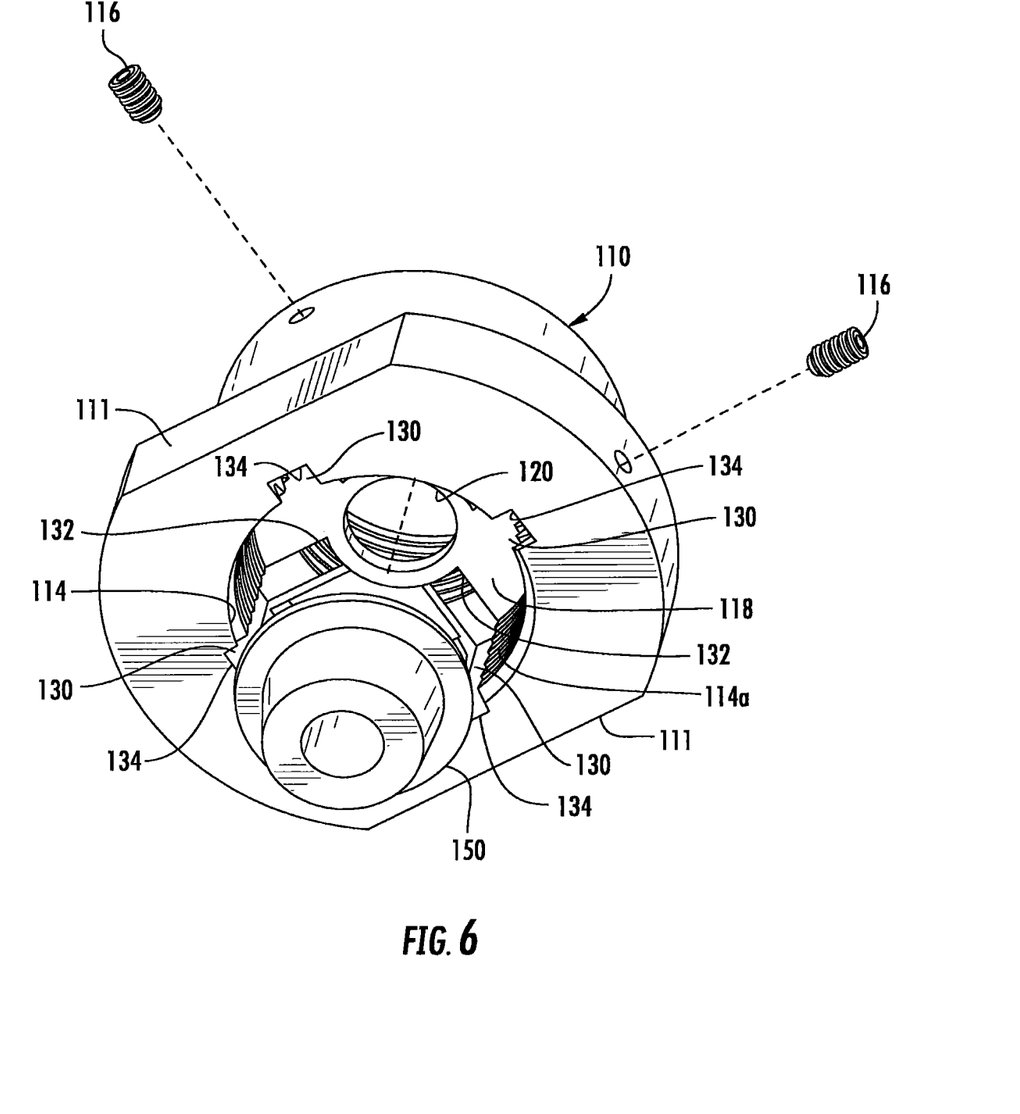
FIG. 6 is an exploded perspective view of the cord grip of FIG. 3.
Figure 7:
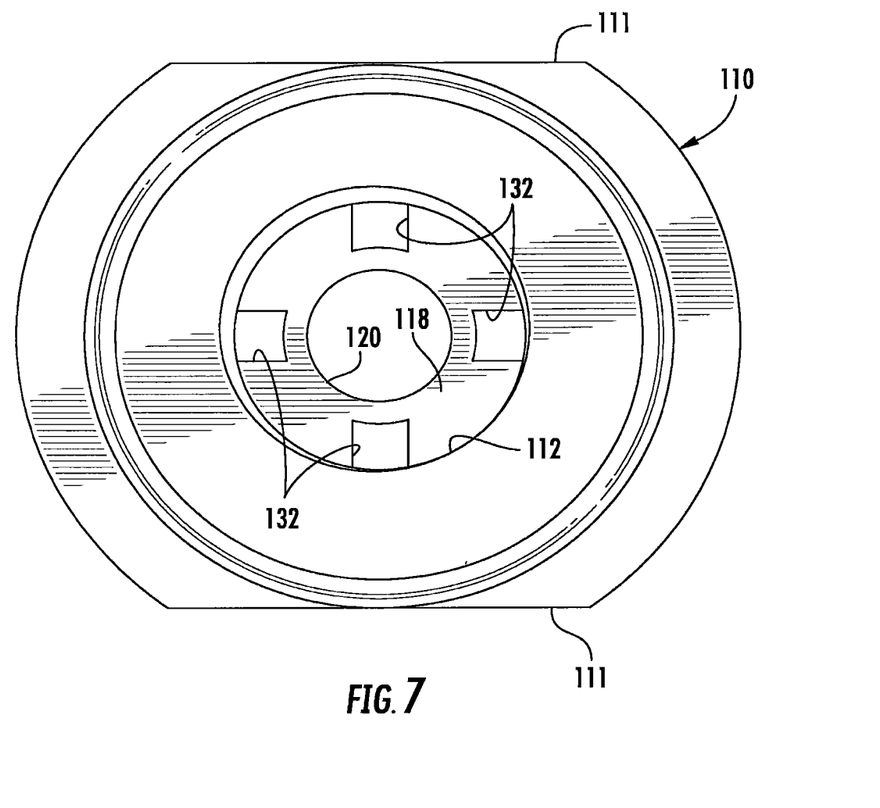
FIG. 7 is a top view of the conduit hub of the cord grip of FIG. 3.
Figure 8:
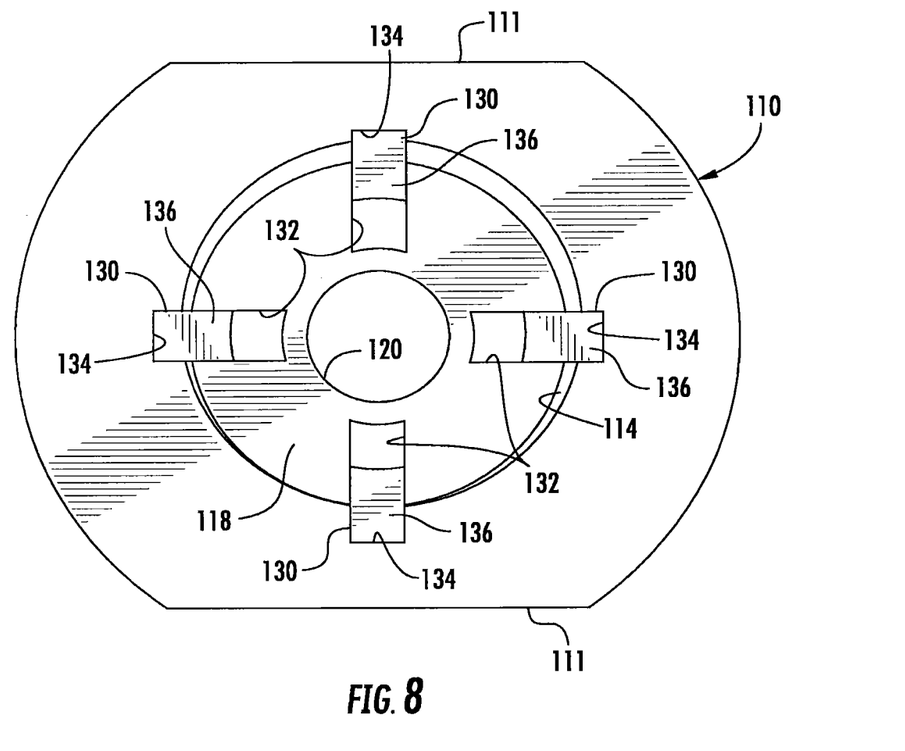
FIG. 8 is a bottom view of the conduit hub of FIG. 7.

Referring to FIG. 4, for example, the wire seal 150 includes a bottom portion 152 that fits into a mating countersunk hole 154 in the bore 103 of the connector 104. The walls of the bottom portion 152 and the countersunk hole 154 are formed at an angle relative to the insertion direction of the wire seal such that the bottom portion 152 and the countersunk 154 hole are shaped as truncated cones. When the conduit hub 110 is assembled, the bottom portion 152 of the wire seal 150 is wedged into the countersunk hole 154 to create a liquid-tight seal therebetween. The wire seal 150 includes a top portion 156 that fits into the hole 120 formed in shoulder 118. The top portion 156 may be formed with a conical shape as shown in FIGS. 3, 5, and 9 or a rounded tapered shape as shown in FIGS. 4 and 10 such that any fluid that flows onto the wire seal 150 from the conduit 102 is directed toward the outside of the wire seal to the channel inlets 132. The top portion 156 is positioned above the inlets to the drainage channels such that water drains from the top of the wire seal to the channels without pooling on top of the wire seal 150. Moreover if the top of the top portion 156 is above the inlet to the channels some water build-up below the wire seal/wiring interface is allowed without causing immediate submersion of the wire seal/wiring interface thereby allowing water to enter the cord grip at a slightly faster pace than it drains. Between the top portion 156 and the bottom portion 152 an extending sealing member 158 is provided that is trapped between the flat upper surface 104a of the connector 104 and the shoulder 118 of the conduit hub 110. The sealing member 158 is compressed between the flat upper surface of the connector 104 and the shoulder 118 of the conduit hub 110 to create a liquid-tight seal therebetween.

Referring to FIG. 9, to assemble the cord grip, the wire seal 150 with the integrated electrical wiring 101 is inserted into the countersunk hole 154 of connector 104. To the extent the wire seal is not provided with permanent integrated wiring the electrical wiring 101 is inserted through the holes in the wire seal and a liquid-tight seal is created between the wiring and the wire seal such as by adhesive, sealant, compression or the like. The electrical wiring 101 is electrically coupled to the wires 100 in the conduit 102 and to electrical conductors 107 in the electronics housing 19. The end of the conduit 102 is secured to the conduit hub 110 such as by threadably engaging screwthreads 102a on the conduit 102 with mating screwthreads 112a on the conduit hub 110. When fully connected the end of the conduit 102 abuts the shoulder 118. The conduit hub 110 is threaded onto the connector 104 trapping the sealing member 158 between the flat upper surface 104a of the connector 104 and the shoulder 118 of the conduit hub. As the conduit hub 118 is tightened on the connector 104, the bottom portion 152 of the wire seal 150 is compressed in the countersunk hole 154. The wire seal 150 creates a liquid-tight seal between the conduit hub 110 and connecter 104. It is to be understood that the order of the steps for assembling the cord grip may vary from the order provided above.

Once assembled, the cord grip of the invention seals the electronics housing 19 and evacuates water or other fluid in the conduit 102 to the exterior of the system via channels 130. Referring to FIG. 9 the water evacuation path is shown by arrows. The water collects inside of the conduit 102, above the wire seal 150. The conical or tapered shape of the upper portion 156 of the wire seal 150 directs the water laterally toward the inlets 132 of the channels 130. The water flows into the inlets 132 and through the channels 130 to the outlets 134. The outlets 134 discharge the water outside of the electronics housing 19 and away from the electronic components contained in the electronics housing 19.

Figure 11:
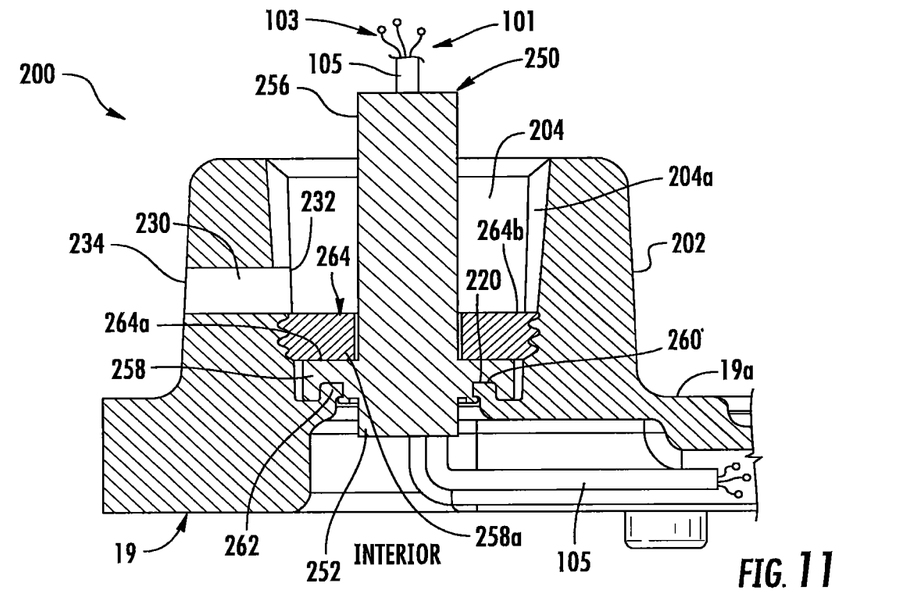
FIG. 11 is a section view of another embodiment of the cord grip of the invention.
Figure 12:
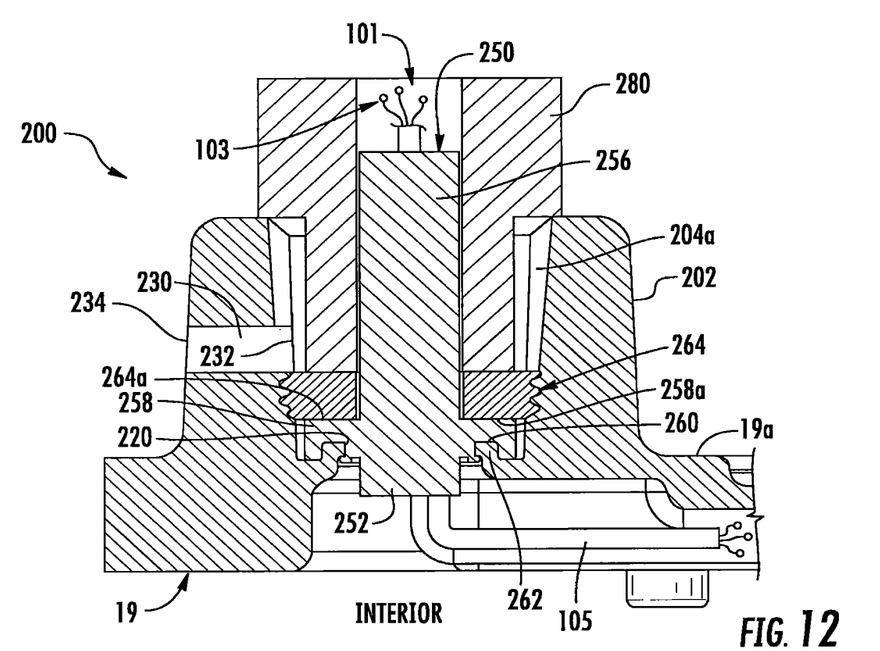
FIG. 12 is a view similar FIG. 11 showing the use of an assembly tool.
Figure 13:
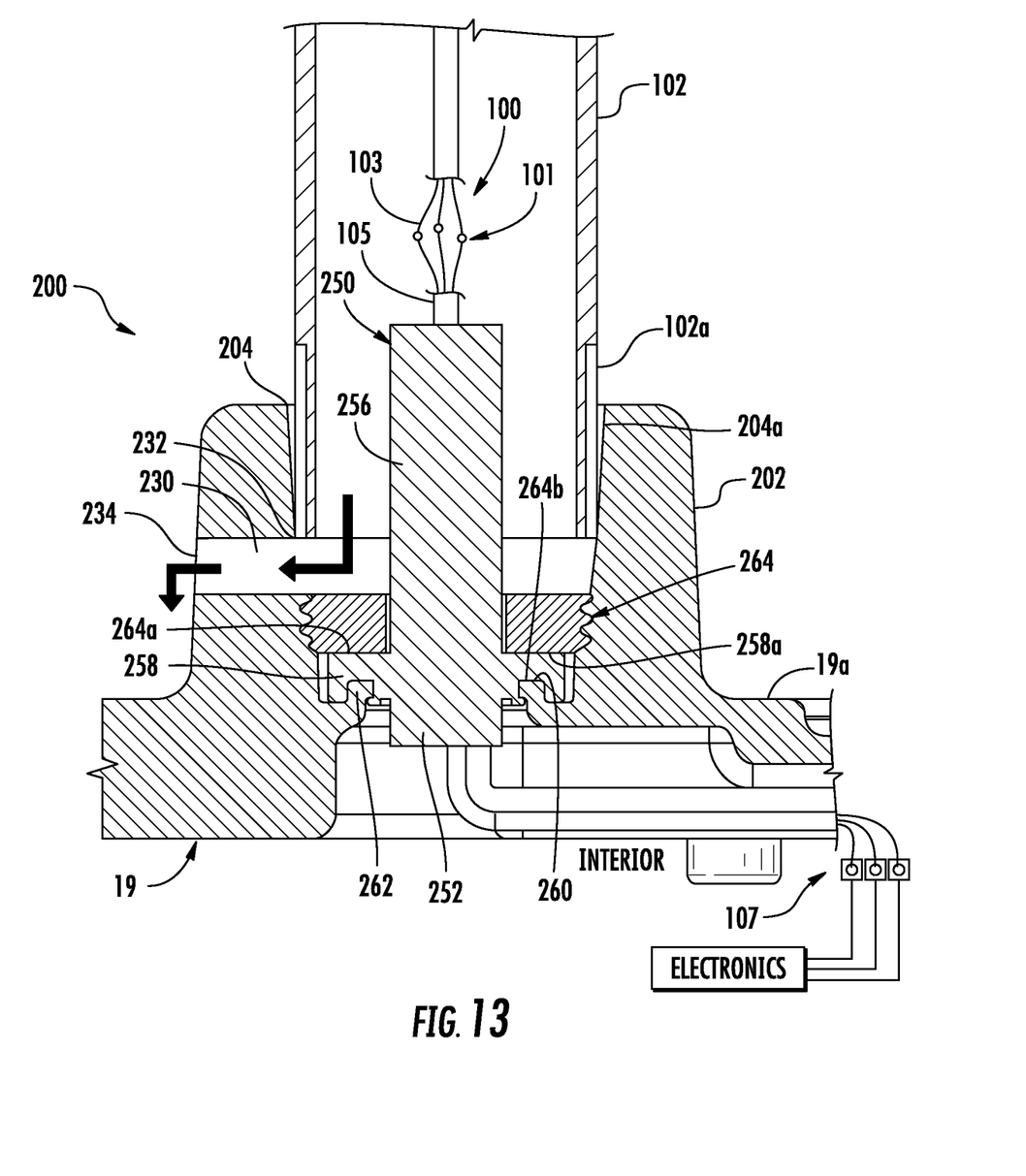
FIG. 13 is a section view showing an electrical conduit attached to the cord grip of FIG. 11.

Another embodiment of the cord grip of the invention is shown in FIGS. 11 through 13. The cord grip 200 comprises a conduit hub 202 that comprises an internally threaded bore 204 that acts as a conduit that communicates the interior of the electronics housing 19 with the exterior of the electronics housing. The threaded bore 204 comprises internal threads 204a that threadably engage with external threads 102a formed on conduit 102. In some embodiments, the conduit hub 202 is formed integrally with a wall 19a of the electronics housing 19. In other embodiments, the conduit hub 202 may be a separate member from the electronics housing 19 and may be connected to the wall 19a of the electronics housing by any suitable mechanism such as welding, a lock nut, separate fasteners or the like. Other mechanisms for connecting the conduit hub 202 to the electronics housing 19 may be used. Moreover, the conduit hub 202 may be formed integrally with the electronics housing 19 as shown in FIG. 13. The conduit hub may have other shapes and configurations from that shown in the drawings.

A wire seal 250 is positioned in the threaded bore 204 of conduit hub 202 that receives the electrical wiring 101 and provides a liquid-tight seal between the conduit hub 202 and the interior of electronics housing 19. The wire seal 250 may made of an elastomeric material such as rubber, thermoplastic elastomers, silicone elastomers or the like. The wire seal 250 is deformable to form a liquid tight seal with the conduit hub 202 as will be described.

As previously described the wire seal 250 receives the electrical wiring 101 such that the electrical wiring 101 extends between the exterior of the electronics housing 19 and the interior of the electronics housing. In one embodiment, the wire seal 250 is overmolded onto the wiring 101 such that the seal and the electrical wiring is overmold bonded to one another as previously described such that a liquid-tight seal is created between the electrical wiring 101 and the seal 250. As previously described the wiring 101 may comprise wires 103 that are encased in a common insulating sheathing 105 that is overmolded to the wire seal or the individual wires may be overmolded to the wire seal 250 such that a liquid-tight seal is created between the individual wires and the wire seal 250. The liquid-tight seal between the wire seal 250 and the electrical wiring may also be formed by a compression fit, adhesive, ultrasonic welding or the like as previously described. Where the electrical wiring 101 is permanently secured in the seal 250, such as by overmolding, the seal 250 and a length of integrated wiring may be provided as a unit where a first connection is made between the integrated electrical wiring and the wiring 100 in the conduit 102 and a second connection is made between the integrated electrical wiring and the conductors 107 in the electronics housing 19.

The wire seal 250 includes a bottom portion 252 that extends to the bottom of bore 204. The wire seal 250 includes a top portion 256 that extends to the top of bore 204 and fits into the end of conduit 102. Between the top portion 256 and the bottom portion 252 an extending sealing member 258 is provided. The sealing member 258 includes an annular channel 260 that receives a mating annular shoulder 262 that extends from the lower end of the bore 204. The shoulder 262 extends from the wall of the bore 204 and defines an opening 220 that receives the wire seal 250. The specific shape and configuration of the wire seal may vary from that shown in the drawings provided the wire seal is capable of providing the liquid tight seal as described herein.

An annular shaped externally threaded lock member 264 is threadably engageable with the screwthreads 204a formed in bore 204. The lock member 264, when fully threaded in bore 204 compresses the sealing ring 258 of wire seal 250 to seat shoulder 262 in channel 260 and to seal the interior of the electronics housing 19 from the upper portion of bore 204. The lock member 264 has a flat lower surface 264a that presses on the flat upper surface 258a of sealing member 258. The upper surface 264b of the lock ring is positioned below the inlet 232 of channel 230 such that the inlet is in liquid communication with the interior of conduit 102 and liquid in the conduit hub 202 may enter the channel inlet 232 and drain out of the conduit hub 202. To control the distance the lock member 264 is threaded into bore 204 a custom tool 280 (FIG. 12) may be provided that engages the lock member 264 such that rotation of the tool 280 threads the lock member 264 into the bore. The tool 280 may be configured to thread the lock member 264 a precise distance into the bore 204 such that the lock member 264 is properly seated against the sealing ring 258 and is positioned below inlet 232. While use of a custom tool 280 is described, any tool for threading the lock member 264 into the bore 204 may be used provided that the lock ring 264 is positioned below the inlet 232 of the channel 230 and the seal ring 264 is properly compressed.

At least one channel 230 is formed in the conduit hub 204 that extends from a channel inlet 232 to a channel outlet 234 that communicates with the exterior of the conduit hub 204. In the illustrated embodiment one channel 230 is shown. However, a greater or fewer number of channels may be provided and the channels may or may not be equally spaced from one another. Each channel 230 extends generally radially from bore 204 and is formed internally of conduit hub 202. The channel inlet 232 is positioned below the end of the conduit 102 when the conduit is connected to the conduit hub 202 such that the inlet 232 is in communication with the interior of the conduit 102 as shown in FIG. 13. The channel outlet 234 is positioned outside of hub 202 such that any water discharged from the channel outlet 234 is deposited to the exterior of the electronics housing. While in the illustrated embodiment the channel 230 is formed as a straight run that extends laterally from the inlet 232 to the outlet 234, the channels 230 may have other shapes provided the channels are capable of transporting the water from the inlet 232 to an outlet 234 that is outside of the electronics housing. For example, the channel may have a more curvilinear or serpentine shape, the channels may have distinct linear portions as previously described or the channels may be angled downwardly rather than extending laterally.

To assembly the cord grip, the wire seal 250 and integrated electrical wiring 101 are inserted into the bore 204 of conduit hub 202. One end of the electrical wiring 101 is electrically coupled to wires 100 in the conduit 102 and the other end of the electrical wiring is connected to electrical conductors 107 in the electronics housing 19. The lock member 264 is threaded into the threaded bore 204 trapping the annular seal ring 258 between the flat bottom surface 264a of the lock member 264 ring and the annular shoulder 262. The end of the conduit 102 is secured to the conduit hub 202 such as by threadably engaging screwthreads 102a on the conduit 102 with mating screwthreads 204a on the conduit hub 202. It is to be understood that the order of the steps for assembling the cord grip may vary from the order provided above.

Once assembled, the cord grip of the invention seals the electronics housing 19 and evacuates water or other liquid in the conduit 102 to the exterior of the (system. Referring to FIG. 13 the water evacuation path is shown by arrows. The liquid collects inside of the conduit 102, above the lock member 264. The liquid flows into the inlet 232 and through the channel 230 to the outlet 234. The outlet 234 discharges the liquid outside of the electronics housing 19 and away from the electronic components contained in the electronics housing 19.

Figure 14:
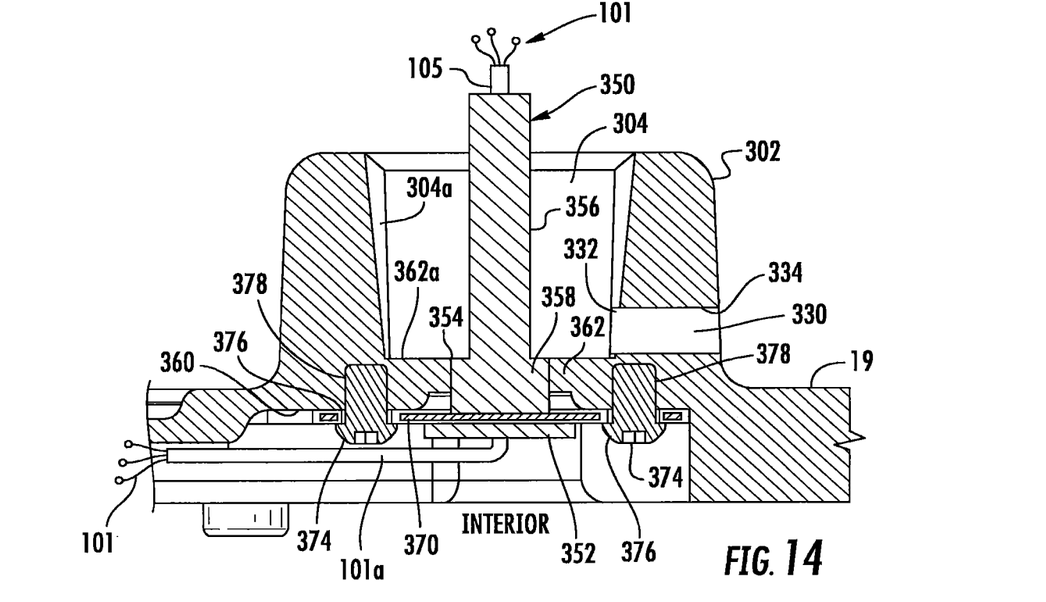
FIG. 14 is a section view of another embodiment of the cord grip of the invention.
Figure 15:
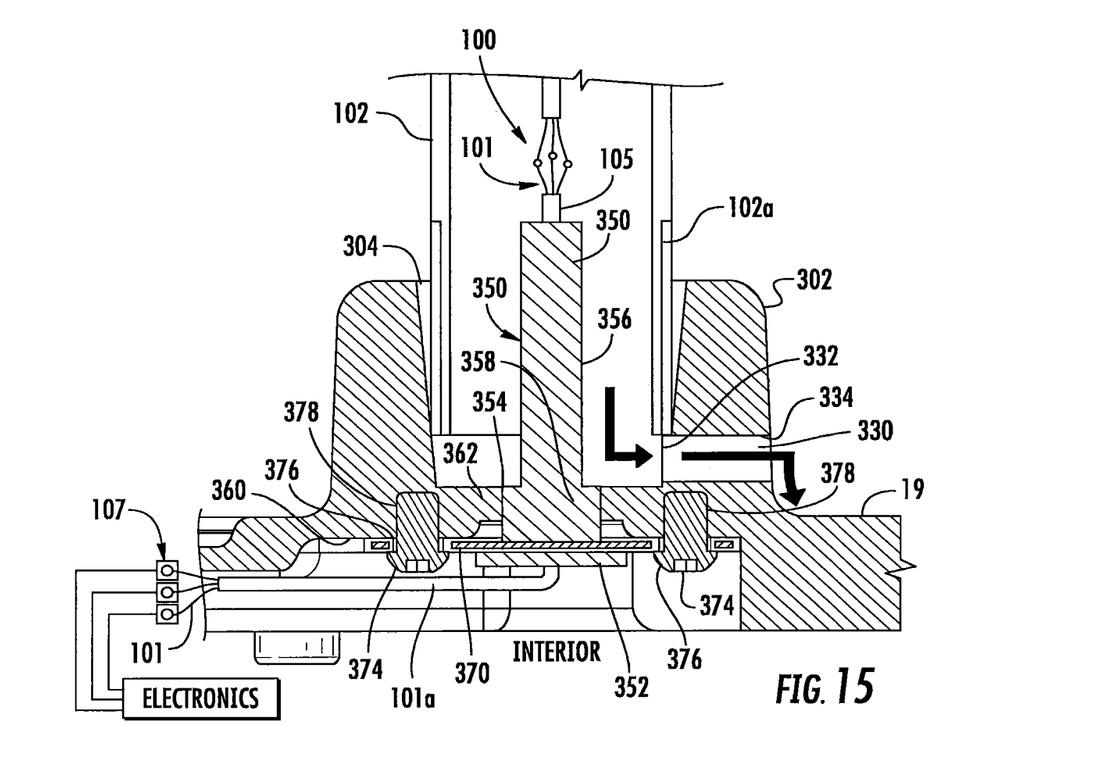
FIG. 15 is a section view showing an electrical conduit attached to the cord grip of FIG. 14.

Another embodiment of the cord grip of the invention is shown in FIGS. 14 and 15. The cord grip comprises a conduit hub 302 that comprises an internally threaded bore 304 that acts as a conduit that communicates the interior of the electronics housing 19 with the exterior of the electronics housing. The threaded bore 304 comprises internal threads 304a that threadably engage with external threads 102a formed on conduit 102. The conduit hub 302 may be formed integrally with the electronics housing 19 or it may be a separate member from the electronics housing 19 and may be connected to a wall of the electronics housing by any suitable mechanism such as welding, a lock nut, separate fasteners or the like. Other mechanisms for connecting the conduit hub 302 to the electronics housing 19 may be used. The conduit hub may have other shapes and configurations from that shown in the drawings.

A wire seal 350 is positioned in the threaded bore 304 of conduit hub 302. Wire seal 350 receives the electrical wires 101 and provides a liquid-tight seal between the conduit, hub 302 and the interior of electronics housing 19. The wire seal 350 may made of an elastomeric material such as rubber, thermoplastic elastomers, silicone elastomers or the like. The wire seal 350 is deformable to form a liquid tight seal with the conduit hub 302 as will be described.

As previously described the wire seal 350 receives the electrical wiring 101 such that the electrical wiring 101 extends through the wire seal 350 and extends between the exterior of the electronics housing 19 and the interior of the electronics housing. In one embodiment, the wire seal 350 is overmolded onto the wiring 101 such that the wire seal is bonded to the wiring 101 to create a liquid-tight seal as previously described. As previously described the wiring 101 may comprise wires 103 that are encased in a common insulating sheathing 105 that is overmolded to the wire seal or the individual wires may be overmolded to the wire seal 350 such that a liquid-tight seal is created between the individual wires and the wire seal 350. The liquid-tight seal between the wire seal 350 and the electrical wiring may also be formed by a compression fit, adhesive, ultrasonic welding or the like as previously described. Where the electrical wiring 101 is permanently secured in the seal 350, such as by overmolding, the seal 350 and a length of integrated wiring may be provided as a unit where a first connection is made between the integrated electrical wiring and the wiring 100 in the conduit 102 and a second connection is made between the integrated electrical wiring and the conductors 107 in the electronics housing 19.

The wire seal 350 includes a bottom portion 352 that extends to the bottom of bore 304. The wire seal 350 includes a top portion 356 that extends upwardly into the conduit 102. Between the top portion 356 and the bottom portion 352 a sealing member 358 is formed that fits into a mating hole 354 formed in a shoulder 362 in the bore 304. The walls of the sealing member 358 and the hole 354 may be formed at an angle relative to the insertion direction of the seal member such that the sealing member 358 and the hole 354 are shaped as truncated cones. When the conduit hub 302 is assembled, the sealing member 358 of the wire seal 350 is wedged into the hole 354 to create a fluid tight seal therebetween. The specific shape and configuration of the wire seal may vary from that shown in the drawings provided the wire seal is capable of providing the liquid tight seal as described herein.

A metal plate 370 is also overmolded as part of the wire seal 350. The metal plate 370 extends substantially perpendicular to the longitudinal axis of bore 304 and is positioned to abut the underside of shoulder 362 when the sealing member 358 is seated in hole 354. The wire seal 350 is held in position in the conduit hub 302 by securing plate 370 to the flat bottom surface 360 of the conduit hub 302. The plate 370 may be secured by fasteners 374 that extend through holes 376 formed in the plate 370 and the overmold material and that engage threaded holes 378 formed in the conduit hub. In addition to securing the wire seal 350 to the conduit hub the overmolded plate 370 also seals the conduit 102 from the interior of the electronics housing 19. The upper surface 362a of the shoulder 362 is positioned below the inlet 332 of channel 330 such that the inlet is in liquid communication with the interior of the conduit 102 and water in the conduit hub 302 may drain out of the channels 330. The specific shape and configuration of the overmolded metal plate may vary from that shown in the drawings.

At least one channel 330 is formed in the conduit hub 304 that extends from a channel inlet 332 to a channel outlet 334 that communicates with the exterior of the conduit hub 304. In the illustrated embodiment one channel 330 is shown. However, a greater or fewer number of channels may be provided and the channels may or may not be equally spaced from one another. Each channel 330 is generally radially extending and is formed in the hub 304. The channel inlet 332 is positioned below the end of the conduit 102 when the conduit is connected to the conduit hub 304 such that the inlet 332 is in communication with the interior of the conduit 302. The channel outlet 334 is positioned outside of hub 304 such that any water discharged from the channel outlet is deposited to the exterior of the electronics housing. While in the illustrated embodiment the channel 330 is formed as a straight run that extends laterally from the inlet to the outlet, the channels may have other shapes provided the channels are capable of moving the water from the inlet that is interior of the end of the conduit to an outlet that is outside of the electronics housing. For example, the channel may have a more curvilinear or serpentine shape, the channels may have distinct linear portions as previously described or the channels may be angled downwardly rather than extending laterally.

To assemble the cord grip, the wire seal 350 and integrated electrical wiring 101 is inserted into the bore 304 of conduit hub 302 such that the seal member 358 is pressed into hole 354. The wire seal 350 is secured in place by fasteners 374. One end of the electrical wiring 101 is electrically coupled to wires 100 in the conduit 102 and the other end of the electrical wiring 101 is connected to electrical conductors 107 in the electronics housing 19. The end of the conduit 102 is secured to the conduit hub 302 such as by threadably engaging screwthreads 102a on the conduit 102 with mating screwthreads 304a in bore 304. It is to be understood that the order of the steps for assembling the cord grip may vary from the order provided above.

Once assembled, the cord grip of the invention seals the electronics housing and evacuates water or other fluid in the conduit to the exterior of the system. Referring to FIG. 15 the water evacuation path is shown by arrows. The water collects inside of the bore 304, above the shoulder 362. The water flows into the inlets 332 and through the channels 330 to the outlets 334. The outlets 334 discharge the water outside of the electronics housing 19 and away from the electronic components contained in the electronics housing 19.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. An apparatus, comprising:
a conduit hub configured to be connected to an electronics housing;
a bore in the conduit hub having a first end communicating with the electronics housing and a second end configured to be connected to a conduit;
a wire seal retaining electrical wiring located in the hub forming a liquid-tight seal between the first end and the second end, wherein the wire seal is retained in the bore by a lock member that holds the wire seal against the conduit hub, and wherein the lock member holds the wire seal against a shoulder positioned in the bore of the conduit hub;
a channel for transporting liquid from the conduit having an inlet in liquid communication with the conduit and an outlet communicating with the exterior of the electronics housing, wherein the channel is positioned internally of and extends through the conduit hub.

2. The apparatus of claim 1 wherein the electrical wiring extends through the wire seal.

3. The apparatus of claim 2 wherein an overmolded bond is formed between the wire seal and the electrical wiring.

4. The apparatus of claim 3 wherein the electrical wiring comprises at least one electrical wire.

5. The apparatus of claim 4 wherein the at least one electrical wire comprises a plurality of electrical wires encased in sheathing.

6. The apparatus of claim 1 wherein the electronics housing is part of a LED lighting fixture.

7. The apparatus of claim 1 wherein the conduit hub is mounted to a connector on the electronics housing.

8. The apparatus of claim 1 wherein the lock member is threadably engaged with screwthreads in the bore.

9. The apparatus of claim 1 wherein the lock member is disposed to a first side of the channel inlet and an end of the wire seal is disposed to a second side of the channel inlet.

10. The apparatus of claim 1 wherein air in the electronics housing is subject to expansion and contraction.

11. An apparatus, comprising:
a conduit hub configured to be connected to an electronics housing, wherein the conduit hub is mounted to a connector on the electronics housing;
a bore in the conduit hub having a first end communicating with the electronics housing and a second end configured to be connected to a conduit;
a wire seal retaining electrical wiring located in the hub forming a liquid-tight seal between the first end and the second end, wherein the wire seal is retained in the bore by a lock member that holds the wire seal against the conduit hub;
a channel for transporting liquid from the conduit having an inlet in liquid communication with the conduit and an outlet communicating with the exterior of the electronics housing, wherein the channel is positioned internally of and extends through the conduit.

* * * * *